US008121189B2

(12) United States Patent
Folta et al.

(10) Patent No.: US 8,121,189 B2
(45) Date of Patent: Feb. 21, 2012

(54) VIDEO DECODING USING CREATED REFERENCE PICTURES

(75) Inventors: Florin Folta, Redmond, WA (US);
Shyam Sadhwani, Bellevue, WA (US);
Naveen Thumpudi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1113 days.

(21) Appl. No.: 11/858,787

(22) Filed: Sep. 20, 2007

(65) Prior Publication Data

US 2009/0080533 A1    Mar. 26, 2009

(51) Int. Cl.
*H04N 11/02*    (2006.01)
(52) U.S. Cl. ............................................. 375/240.02
(58) Field of Classification Search .................. 375/240, 375/240.01–240.29; 382/232–253, 276, 382/309
See application file for complete search history.

(56) References Cited

U.S. PATENT DOCUMENTS

| | | | |
|---|---|---|---|
| 5,568,200 A | 10/1996 | Pearlstein et al. | |
| 5,724,446 A | 3/1998 | Liu et al. | |
| 6,005,982 A | 12/1999 | Abe | |
| 6,151,034 A | 11/2000 | Jain | |
| 6,272,180 B1 | 8/2001 | Lei | |
| 6,275,239 B1 * | 8/2001 | Ezer et al. | 345/473 |
| 6,404,817 B1 | 6/2002 | Saha et al. | |
| 6,470,049 B1 * | 10/2002 | Nguyen | 375/240 |
| 6,522,694 B1 | 2/2003 | Ryan | |
| 7,068,722 B2 | 6/2006 | Wells | |
| 7,113,542 B2 * | 9/2006 | Tanaka | 375/240.01 |
| 7,149,247 B2 | 12/2006 | Sullivan | |
| 7,496,282 B2 * | 2/2009 | Kochale | 386/263 |
| 7,751,473 B2 * | 7/2010 | Hannuksela | 375/240.01 |
| 7,792,374 B2 * | 9/2010 | Ohira | 382/239 |
| 2002/0141502 A1 | 10/2002 | Lin et al. | |
| 2004/0047614 A1 | 3/2004 | Green | |
| 2004/0139462 A1 | 7/2004 | Hannuksela et al. | |
| 2004/0190617 A1 | 9/2004 | Shen et al. | |
| 2004/0247030 A1 | 12/2004 | Wiethoff | |
| 2005/0089104 A1 | 4/2005 | Kim | |

(Continued)

FOREIGN PATENT DOCUMENTS

WO    WO 2006020019    2/2006

(Continued)

OTHER PUBLICATIONS

Chung et al., "DCT Based Error Concealment for RTSP Video Over a Modem Internet Connection," *Proceedings of the 1998 IEEE International Symposium on Circuits and Systems*, 1998, 4 pp.

(Continued)

*Primary Examiner* — Dmitry H Levitan
(74) *Attorney, Agent, or Firm* — Klarquist Sparkman, LLP

(57) ABSTRACT

Reference pictures can be created to assist with video decoding. For example, a method for decoding video can comprise receiving an encoded video bit stream, determining that a reference picture is needed, and creating and inserting the reference picture into the encoded video bit stream. A method for decoding video can also comprise receiving an encoded video bit stream, performing bit stream parsing, determining that a reference picture is needed, selecting a representation level for the reference picture, and conveying data for the selected reference picture to a hardware accelerated graphics processing unit. Various video operations, such as creating reference pictures and related information, can be performed by central processing units, while other video decoding operations can be performed by graphics processing units.

17 Claims, 11 Drawing Sheets

U.S. PATENT DOCUMENTS

| | | | |
|---|---|---|---|
| 2005/0123057 | A1 | 6/2005 | MacInnis et al. |
| 2005/0232359 | A1 | 10/2005 | Cha |
| 2005/0278502 | A1 | 12/2005 | Hundley |
| 2006/0002479 | A1 | 1/2006 | Fernandes |
| 2006/0013318 | A1 | 1/2006 | Webb et al. |
| 2006/0039475 | A1 | 2/2006 | Liu et al. |
| 2006/0045190 | A1 | 3/2006 | Sun et al. |
| 2006/0062304 | A1 | 3/2006 | Hsia |
| 2006/0098732 | A1 | 5/2006 | Bruna et al. |
| 2006/0104366 | A1 | 5/2006 | Huang et al. |
| 2006/0146940 | A1 | 7/2006 | Gomila et al. |
| 2006/0233239 | A1 | 10/2006 | Sethi et al. |
| 2006/0251177 | A1 | 11/2006 | Webb |
| 2007/0014359 | A1 | 1/2007 | Gomila et al. |
| 2007/0033494 | A1* | 2/2007 | Wenger et al. ............... 714/776 |
| 2007/0053445 | A1 | 3/2007 | Schaar et al. |
| 2007/0086526 | A1 | 4/2007 | Koto et al. |
| 2007/0091997 | A1 | 4/2007 | Fogg et al. |
| 2007/0098080 | A1 | 5/2007 | Diard et al. |
| 2007/0116128 | A1 | 5/2007 | Evans et al. |
| 2007/0153898 | A1 | 7/2007 | Yim |
| 2007/0177678 | A1 | 8/2007 | Subramania et al. |
| 2007/0211055 | A1 | 9/2007 | Stein et al. |
| 2007/0223595 | A1 | 9/2007 | Hannuksela |
| 2007/0242080 | A1* | 10/2007 | Hamada et al. ............... 345/606 |
| 2008/0002773 | A1 | 1/2008 | Lai |
| 2008/0049844 | A1 | 2/2008 | Liu et al. |
| 2008/0049845 | A1 | 2/2008 | Liu |
| 2008/0107184 | A1 | 5/2008 | Katsavounidis et al. |
| 2008/0130754 | A1 | 6/2008 | Winger |
| 2009/0052858 | A1 | 2/2009 | Date |
| 2009/0074075 | A1 | 3/2009 | Au |

FOREIGN PATENT DOCUMENTS

| | | |
|---|---|---|
| WO | WO2006/111915 | 10/2006 |
| WO | WO 2006134110 | 12/2006 |

OTHER PUBLICATIONS

Lee et al., "Error-Resilient Image Coding (ERIC) with Smart-IDCT Error Concealment Technique for Wireless Multimedia Transmission," *IEEE Transactions on Circuits and Systems for Video Technology*, vol. 13, No. 2, Feb. 2003, pp. 176-181.

Nemethova et al., "Flexible Error Concealment for H.264 Based on Directional Interpolation," *IEEE Proceedings of the WirelessCom Conference on Wireless Networks, Communications and Mobile Computing*, Jun. 2005, 6 pages.

Park et al., "Content-Based Adaptive Spatio-Temporal Methods for MPEG Repair," *IEEE Transactions on Image Processing*, vol. 13, No. 8, Aug. 2004, pp. 1066-1077.

Su et al., "Improved Error Concealment Algorithms Based on H.264/ AVC Non-normative Decoder," *2004 IEEE International Conference on Multimedia and Expo*, Jun. 2004, 4 pages.

Swann, "Resilient Video Coding for Noisy Channels," *IEEE Colloquium on Data Compression: Methods and Implementations*, 1999, 5 pp.

Thomos et al., "Error-Resilient Transmission of H.264/AVC Streams Using Flexible Macroblock Ordering," The $2^{nd}$ *European Workshop on the Integration of Knowledge, Semantics and Digital Media Technology*, 2005, 7 pages.

Shen et al., "Accelerate Video Decoding With Generic GPU," *IEEE Transactions on Circuits and Systems for Video Technology*, vol. 15, No. 5, pp. 685-693, May 2005.

Patel et al., "Performance of a Software MPEG Video Decoder," <http://www.cs.cornell.edu/Info/Faculty/bsmith/MM93.ps. Z>, 8 pages, 1993.

Bordoloi et al., "Hardware Accelerated Interactive Vector Field Visualization: A level of detail approach," Eurographics 2002, vol. 21, No. 3, 10 pp. (2002).

Digit-Life, "AMD/ATI and NVIDIA Graphics Cards in Video Decoding Tasks," Jun. 25, 2007, http://www.digit-life.com/articles2/video/video.dec.2007-page1.html, 9 pages.

Fiedler, "Implementation of a Basic H.264/AVC Decoder," Chemnitz University of Technology, Faculty of Computer Science, Seminar Paper, 28 pp., Jun. 1, 2004.

Geomantics, "GenesislV Tutorial: Startup issues," http://www.geomantics.com/tutorial22.htm, visited on Sep. 24, 2008, 3 pages.

"H.264/MPEG-4 AVC," Wikipedia, 8 pp., May 27, 2009. http://en.wikipedia.org/wiki/H.264.

ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).

Marpe, "The H.264/MPEG4 Advanced Video Coding Standard and Its Applications," IEEE Communications Magazine, Standards Report, 10 pp., Aug. 2006.

Microsoft Corporation, "Error Message: CONF Caused a Divide Error in Module Msvfw32.dll," http://support.microsoft.com/kb/263031, Oct. 2006, 2 pages.

Sonic Solutions, "CinePlayer™ DVD Decoder Pack for Windows® XP," http://www.sonic.com/products/Consumer/CinePlayer/Technology/acceleration.aspx , ©2007, visited on Sep. 24, 2008, 10 pages.

Sullivan et al., "The H.264/AVC Advanced Video Coding Standard: Overview and Introduction to the Fidelity Range Extensions," SPIE Conference on Applications of Digital Image Processing XXVII, Special Session on Advances in the New Emerging Standard, 21 pp., Aug. 2004.

The Elder Geek on Windows XP, "Camtasia Why Playback is Black" http://www.theeldergeek.com/forum/lofiversion/index.php?t15009.html, Dec. 2005, 5 pages.

Wang et al., "A Platform-Based MPEG-4 Advanced Video Coding (AVC) Decoder with Block Level Pipelining," Proceedings of the 2003 Joint Conference of the Fourth International Conference on Information, Communications and Signal Processing, and the Fourth Pacific Rim Conference on Multimedia, vol. 1, Issue 15-18, pp. 51-55, Dec. 2003.

Microsoft Corporation, "Microsoft Windows XP Professional Resource Kit, Second Edition," 28 pp. (Jun. 11, 2003).

\* cited by examiner software 180 implementing one or more video encoding and/or decoding innovations

VIDEO DECODING USING CREATED REFERENCE PICTURES

BACKGROUND

Companies and consumers increasingly depend on computers to process, distribute, and play back high quality video content. Engineers use compression (also called encoding) to reduce the bit rate of digital video. Compression decreases the cost of storing and transmitting video information by converting the information into a lower bit rate form. Decompression (also called decoding) reconstructs a version of the original information from the compressed form. A "codec" refers to an encoder/decoder of digital video.

Decoding video content can be a relatively straightforward task when video is encoded in a manner expected and supported by a video decoder. However, when video is encoded in an unexpected and/or unsupported manner, or when encoded video is somehow altered, damaged, or used in an unexpected way, video decoding can be difficult or impossible.

Some video coding standards use a variety of picture types. For example, some picture types can be decoded without reference to other pictures in the video sequence, and are called reference pictures or key pictures. Other picture types depend on the presence of other pictures in order to be decoded, and are called predicted pictures. While a video coding standard may not require that encoded video begin with, or even include, a reference picture, video decoders implementing the standard may nevertheless be unable to decode video without a reference picture.

If encoded video does not begin with a reference picture, a video decoder may be unable to decode the video. If encoded video does not begin with a reference picture, but a reference picture is present later in the encoded video, a video decoder may be able to decode the video after reaching the reference picture. However, this may result in a long delay before display of the video begins.

Therefore, there exists ample opportunity for improvement in technologies related to decoding video.

SUMMARY

In summary, the detailed description is directed to various techniques and tools for decoding video using created reference pictures.

In a method for decoding video, an encoded video bit stream can be received. A determination whether a reference picture is needed in order to decode the encoded video bit stream can be made (e.g., based on analysis of the bit stream along with capabilities of video decoding resources). In the case that the reference picture is needed, a reference picture is created. The created reference picture can be inserted (e.g., encoded) into the encoded video bit stream. The encoded video bit stream with the inserted reference picture can then be decoded (e.g., a video decoder that would be incapable of decoding without a reference picture can decode the encoded video bit stream using, at least in part, the created inserted reference picture).

A method for decoding video can be provided. For example, the method can comprise receiving an encoded video bit stream and performing bit stream parsing. Based on the parsing, a determination can be made that a reference picture is needed in order to decode the encoded video bit stream. For example, the determination can comprise determining that the received bit stream does not begin with a real reference picture and that a hardware accelerated graphics processing unit would not be able to decode the bit stream without a reference picture. A representation level can be selected for a created reference picture (e.g., the representation level can be a variable length decoding level, an inverse transform level, or a motion compensation level). Data for the selected representation level for the created reference picture can then be conveyed to a hardware accelerated graphics processing unit. The hardware accelerated graphics processing unit can perform decoding operations using the received information, including the data for the selected representation level for the created reference picture.

A method for decoding video using created reference pictures can be implemented using one or more central processing units (CPUs) in combination with one or more graphics processing units (GPUs). For example, the method can perform the following using one or more CPUs: receive an encoded video bit stream lacking a reference picture, perform one or more video decoding operations comprising bit stream parsing, based on the parsing, create a reference picture, and send information for the created reference picture and the encoded video bit stream to one or more GPUs. The method can perform, using the one or more GPUs, one or more video decoding operations using the information for the created reference picture and the encoded video bit stream received from the one or more CPUs.

A system for decoding video using created reference pictures can be provided. For example, the system can comprise one or more CPUs and one or more GPUs. The CPUs can perform tasks such as: receiving encoded video bit streams, performing video decoding operations, determining that reference pictures are needed, creating reference pictures, selecting representation levels, and sending information and/or data for created reference pictures to hardware accelerated graphics processing units. The GPUs can perform tasks such as: performing video decoding operations such as variable length decoding, inverse transform, and motion compensation using encoded video bit streams and created reference picture information and/or data received from the CPUs.

The described techniques and tools for decoding video using created reference pictures can be implemented separately or in combination. For example, some operations can be performed by different hardware or software components (e.g., some operations can be performed by software and/or firmware running on CPUs and other operations can be performed by software and/or firmware running on GPUs).

DETAILED DESCRIPTION

The following description is directed to techniques, tools, and solutions for decoding video using created reference pictures.

The various techniques, tools, and solutions can be used in combination or independently. Different embodiments can implement one or more of the described techniques, tools, and solutions.

I. Computing Environment

The technologies, techniques, and solutions described herein can be implemented on any of a variety of devices in which video processing is performed (e.g., video processing devices), including among other examples, computers, multimedia devices, streaming video devices, portable or stand-alone video players, gaming devices, and the like. The technologies, techniques, and solutions described herein can be implemented in hardware, software, firmware, or a combination.

Figure 1:
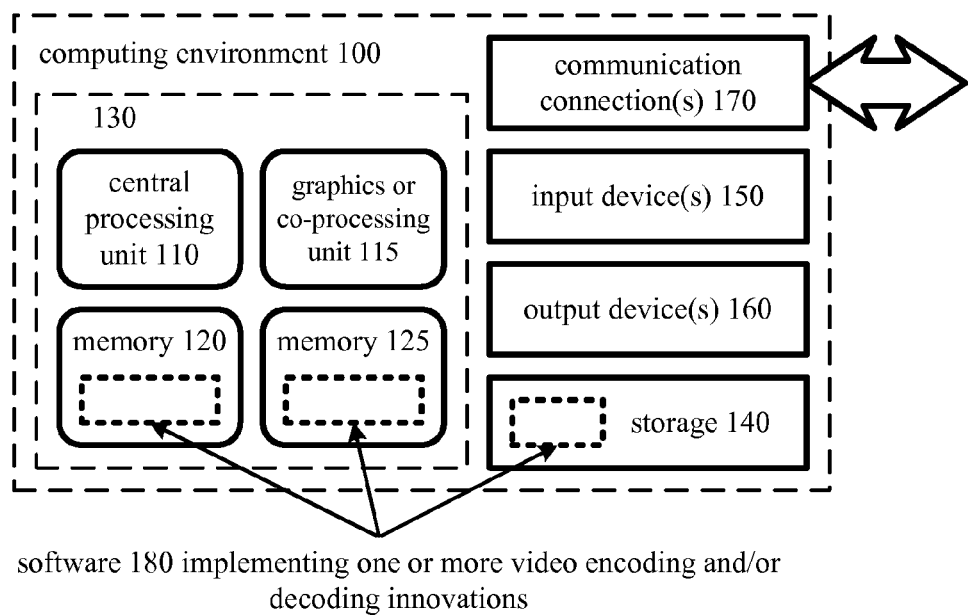
FIG. 1 is a block diagram of a suitable computing environment in which some described techniques and tools may be implemented.

FIG. 1 illustrates a generalized example of a suitable computing environment 100 in which described embodiments may be implemented. The computing environment 100 is not intended to suggest any limitation as to scope of use or functionality of the invention, as the present invention may be implemented in diverse general-purpose or special-purpose computing environments.

With reference to FIG. 1, the computing environment 100 includes at least one central processing unit (CPU) 110 and associated memory 120 as well as at least one graphics processing unit (GPU) 115 and associated memory 125 used for hardware video acceleration. In FIG. 1, this most basic configuration 130 is included within a dashed line. The processing unit 110 executes computer-executable instructions and may be a real or a virtual processor. In a system supporting hardware accelerated video decoding, decoding tasks can be split between the CPU and the GPU (e.g., the CPU and GPU can execute computer-executable instructions to increase processing power and/or efficiency). A host encoder or decoder process can offload certain operations (e.g., variable length decoding, inverse transforms, and/or motion compensation) to the GPU 115. The memory, 120 and 125, may be volatile memory (e.g., registers, cache, RAM), non-volatile memory (e.g., ROM, EEPROM, flash memory, etc.), or some combination of the two. The memory, 120 and 125, stores software 180 implementing one or more of the video encoding and/or decoding innovations described herein.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, DVDs, or any other medium which can be used to store information and which can be accessed within the computing environment 100. The storage 140 stores instructions for the software 180.

The input device(s) 150 may be a touch input device such as a keyboard, mouse, pen, or trackball, a voice input device, a scanning device, or another device that provides input to the computing environment 100. For audio or video encoding, the input device(s) 150 may be a sound card, video card, TV tuner card, or similar device that accepts audio or video input in analog or digital form, or a CD-ROM or CD-RW that reads audio or video samples into the computing environment 100. The output device(s) 160 may be a display, printer, speaker, CD-writer, or another device that provides output from the computing environment 100.

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The technologies, techniques, and solutions described herein can be described in the general context of computer-readable media. Computer-readable media are any available media that can be accessed within a computing environment. By way of example, and not limitation, with the computing environment 100, computer-readable media include memory 120, storage 140, communication media, and combinations of any of the above.

The technologies, techniques, and solutions described herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "receive," "determine," and "create" to describe computer operations in a computing environment. These terms are high-level abstractions for operations performed by a computer, and should not be confused with acts performed by a human being. The actual computer operations corresponding to these terms vary depending on implementation.

II. Generalized Video Decoder.

Figure 2:
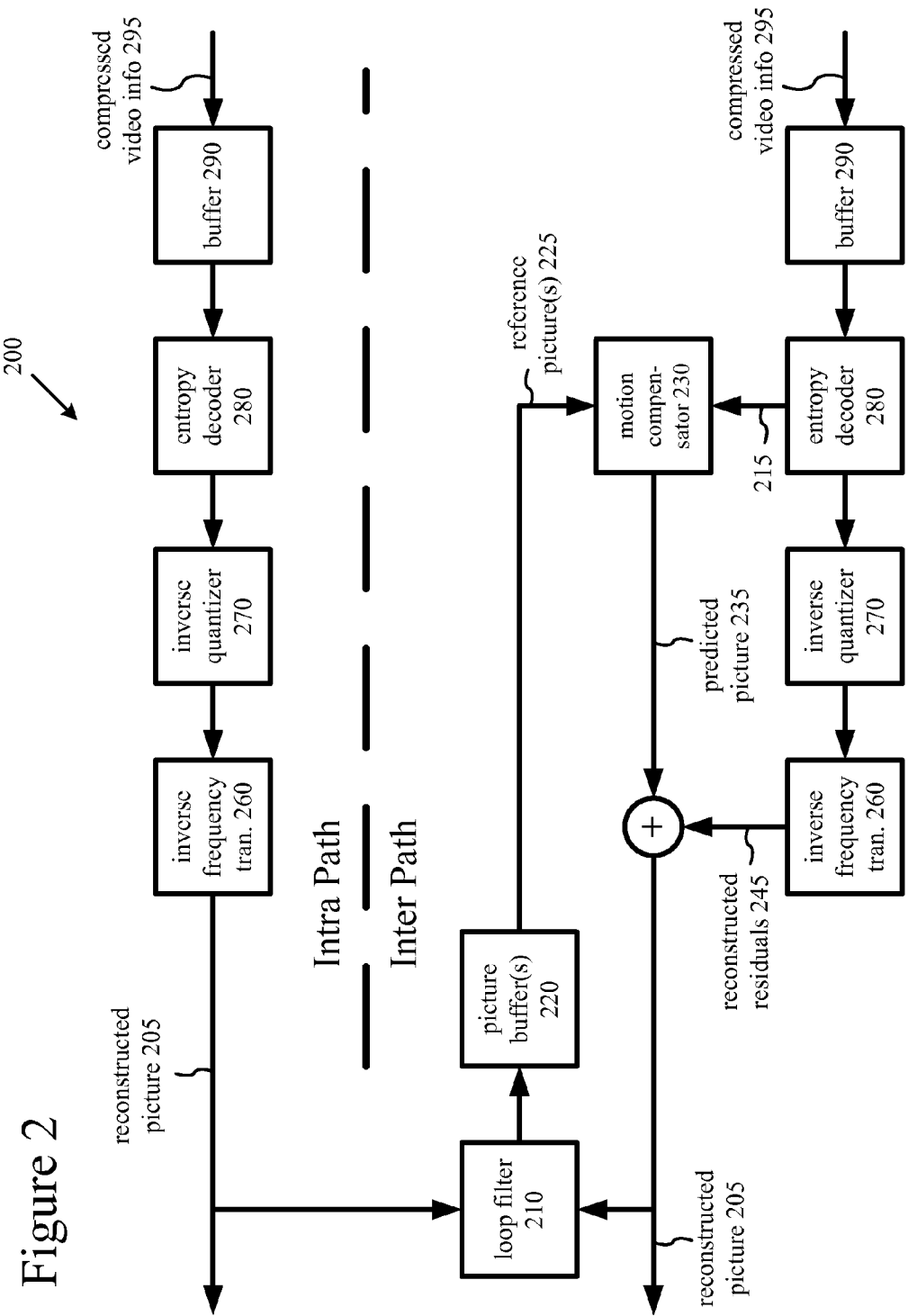
FIG. 2 is a block diagram of a generalized video decoder in conjunction with which several of the described embodiments may be implemented.

FIG. 2 is a block diagram of a generalized video decoder 200 in conjunction with which several described embodiments may be implemented. A corresponding video encoder (not shown) may also implement one or more of the described embodiments.

The relationships shown between modules within the decoder 200 indicate general flows of information in the decoder; other relationships are not shown for the sake of simplicity. In particular, while a decoder host (e.g., running on one or more CPUs) performs some operations of modules of the decoder 200, a hardware video accelerator (e.g., running on one or more GPUs) performs other operations (such as variable length decoding, inverse frequency transforms, fractional sample interpolation, motion compensation, in-loop deblocking filtering, color conversion, post-processing filtering and/or picture re-sizing). For example, the decoder 200 can pass instructions and/or information to the video accelerator (e.g., as described in "Microsoft DirectX VA: Video Acceleration API/DDI," version 1.01, a later version of DXVA or another acceleration interface). In general, once the video accelerator reconstructs video information, it maintains some representation of the video information rather than passing information back. For example, after a video accelerator reconstructs an output picture, the accelerator stores it in a picture store, such as one in memory associated with a GPU, for use as a reference picture. The accelerator then performs in-loop deblock filtering and fractional sample interpolation on the picture in the picture store.

In some implementations, different video acceleration profiles result in different operations being offloaded to a video accelerator. For example, one profile may only offload motion compensation decoding operations, another profile may offload inverse transform and motion compensation decoding operations, and yet another profile may offload variable length decoding, inverse transform, and motion compensation decoding operations.

Returning to FIG. 2, the decoder 200 processes video pictures, which may be video frames, video fields, or combinations of frames and fields. The bit stream syntax and semantics at the picture and macroblock levels may depend on whether frames or fields are used. The decoder 200 is block-based and uses a 4:2:0 macroblock format for frames. For fields, the same or a different macroblock organization and format may be used. 8×8 blocks may be further sub-divided at different stages. Alternatively, the decoder 200 uses a different macroblock or block format, or performs operations on sets of samples of different size or configuration.

The decoder 200 receives information 295 for a compressed sequence of video pictures (e.g., an encoded video bit stream) and produces output including a reconstructed picture 205 (e.g., progressive video frame, interlaced video frame, or field of an interlaced video frame). The decoder system 200 decompresses predicted pictures and key pictures. For the sake of presentation, FIG. 2 shows a path for key pictures through the decoder system 200 and a path for predicted pictures. Many of the components of the decoder system 200 are used for decompressing both key pictures and predicted pictures. The exact operations performed by those components can vary depending on the type of information being decompressed.

A demultiplexer with a buffer 290 receives the information 295 for the compressed video sequence and makes the received information available to the entropy decoder 280. The entropy decoder 280 entropy decodes entropy-coded quantized data as well as entropy-coded side information, typically applying the inverse of entropy encoding performed in the encoder. A motion compensator 230 applies motion information 215 to one or more reference pictures 225 to form motion-compensated predictions 235 of sub-blocks, blocks and/or macroblocks of the picture 205 being reconstructed. One or more picture stores store previously reconstructed pictures for use as reference pictures.

The decoder 200 also reconstructs prediction residuals. An inverse quantizer 270 inverse quantizes entropy-decoded data. An inverse frequency transformer 260 converts the quantized, frequency domain data into spatial domain video information. For example, the inverse frequency transformer 260 applies an inverse block transform to sub-blocks and/or blocks of the frequency transform coefficients, producing sample data or prediction residual data for key pictures or predicted pictures, respectively. The inverse frequency transformer 260 may apply an 8×8, 8×4, 4×8, 4×4, or other size inverse frequency transform.

For a predicted picture, the decoder 200 combines reconstructed prediction residuals 245 with motion compensated predictions 235 to form the reconstructed picture 205. A motion compensation loop in the video decoder 200 includes an adaptive deblocking in-loop filter 210. The decoder 200 applies the in-loop filtering 210 to the reconstructed picture to adaptively smooth discontinuities across block/sub-block boundary rows and/or columns in the picture. The decoder stores the reconstructed picture in a picture buffer 220 for use as a possible reference picture.

Depending on implementation and the type of compression desired, modules of the decoder can be added, omitted, split into multiple modules, combined with other modules, and/or replaced with like modules. In alternative embodiments, encoders or decoders with different modules and/or other configurations of modules perform one or more of the described techniques. Specific embodiments of video decoders typically use a variation or supplemented version of the generalized decoder 200.

III. Simplified Video Encoding and Decoding Operations.

Figure 3:
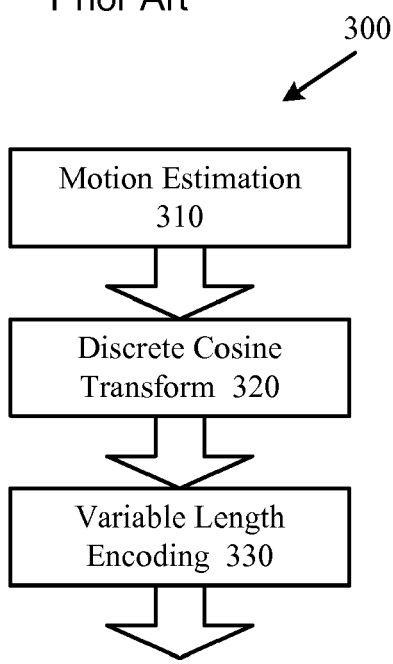
FIG. 3 is a diagram of simplified video encoding operations.

FIG. 3 is an example diagram showing simplified video encoding operations 300. The example video encoding operations 300 are common operations used by video encoders to encode video. For example, a video encoder can receive a sequence of video images and, using the simplified operations 300, generate an encoded video bit stream representing the sequence of video images.

The motion estimation 310 video encoding operation attempts to detect regions of a current picture that are similar to regions of previous pictures (e.g., reference pictures) or later pictures.

Operation 320 is a discrete cosine transform (DCT) operation. Instead of, or in addition to, a discrete cosine transform, another type of transform can be used. Typically, there are some regions of a picture that cannot be predicted using reference pictures. Even for regions that can be predicted using reference pictures, there is some difference (e.g., residual data). A discrete cosine transform operation can be used to compress this information. In addition, motion vector information and reference identifiers need to be encoded in the bit stream.

Operation 330 is a variable length encoding operation. For example, variable length encoding 330 can be used to further compress coefficients from the discrete cosine transform 320 operation and motion vectors. Instead of, or in addition to, variable length encoding 330, other compression techniques can be used.

Figure 4:
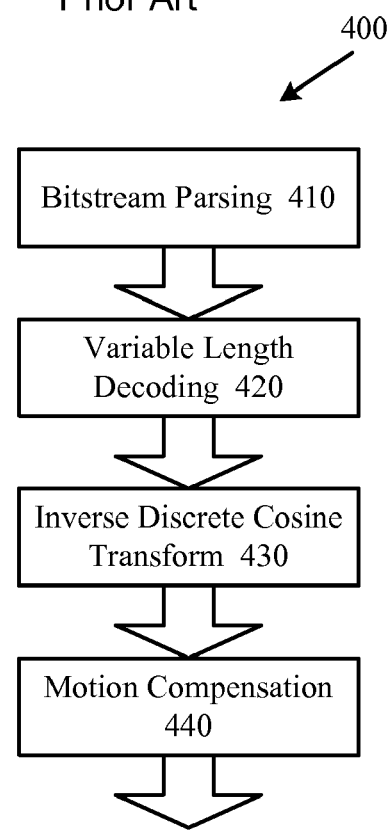
FIG. 4 is a diagram of simplified video decoding operations.

FIG. 4 is an example diagram showing simplified video decoding operations 400. The example video decoding operations 400 are common operations used by video decoders to decode video. For example, a video decoder can receive an encoded video bit stream (e.g., encoded using operations such as those depicted in FIG. 3) and, using the simplified operations 400, produce decoded video which can be displayed on a display device, such as a computer display. The simplified video decoding operations 400 include bit stream parsing 410, variable length decoding 420, inverse discrete cosine transform (IDCT) 430, and motion compensation 440. There might be post processing operations as well (e.g., loop filter, color space conversion, de-interlacing etc.).

IV. Innovations in Video Decoding using Created Reference Pictures

This section describes video decoding techniques and solutions that can be applied to video decoding situations where a real reference picture is not available to begin decoding. For example, some video standards, such as ITU-T H.262 (video MPEG2) and ITU-T H.264 (video MPEG4 AVC), allow video streams to be encoded without reference pictures. In some decoding scenarios, in order to start decoding a decoder needs at least one reference picture. In order to allow decoding operations to continue without a real reference picture, the decoding techniques and solutions described herein provide a created reference picture.

The techniques and solutions described herein can be applied to video encoded using a variety of coding standards. For example, reference pictures can be created to assist with decoding video encoded according to standards such as WMV, VC-1, H.261, H.263, H.264, MPEG1, and MPEG2.

A real reference picture of an encoded video stream (e.g., a video bit stream) is a reference picture generated at the time the video stream is created. Typically, when video content is encoded (e.g., a movie, video clip, or other video content), reference pictures are used for quality reasons and for other purposes such as error recovery. Once the encoded video stream has been created, it can be sent to a recipient. For example, the encoded video stream can be broadcast to a recipient computer via the Internet.

A real reference picture may not be available to a decoder for a variety of reasons. For example, a video stream may be received in progress (e.g., when changing a video channel or receiving a broadcast stream). A reference picture may not be available due to various error conditions, such as lost picture data (e.g., due to transmission problems, read error, bit stream corruption, or signal loss). A reference picture may not be available due to a random access condition (e.g., seeking to a random video file location). Reference pictures can also be unavailable for other reasons (e.g., a video stream can be encoded without any reference pictures).

Solutions for creating a reference picture to begin (or continue) video decoding can be implemented using a video decoder (or other hardware and/or software) running on one or more central processing units (CPUs) (e.g., running only on one or more CPUs and not on any GPUs). Solutions for creating a reference picture to begin (or continue) video decoding can also be implemented using video decoding components or modules, some running on one or more CPUs, and others running on one or more GPUs. For example, a decoder can generate (e.g., on the fly) a compressed reference picture (e.g., a compressed reference frame) and insert it into an incoming video stream to offer a starting point for the decoding process.

In a specific implementation, software running on a central processing unit receives an encoded video bit stream. The software running on the CPU performs bit stream parsing and determines that a reference picture is needed (e.g., there is no reference picture at, or near, the beginning of the encoded video bit stream). In response, the software creates a reference picture and inserts (e.g., using various video encoding operations) it into the encoded video bit stream (e.g., at the beginning of the bit stream). The software then sends the encoded video bit stream with the created inserted reference picture to a video decoder (e.g., an MPEG2 or MPEG4 video decoder) running on the CPU.

In another specific implementation, software running on a central processing unit receives an encoded video bit stream. The software running on the CPU performs bit stream parsing and determines that a reference picture is needed (e.g., there is no reference picture at, or near, the beginning of the encoded video bit stream). In response, the software creates a reference picture. The software then sends the encoded video bit stream, including the created reference picture (e.g., encoded within the bit stream), to a hardware accelerated video decoder running on one or more GPUs. The hardware accelerated video decoder performs other decoding operations, including variable length decoding, inverse transforms, and motion compensation, using the received encoded video bit stream.

In yet another specific implementation, software running on a central processing unit receives an encoded video bit stream. The software running on the CPU performs bit stream parsing and determines that a reference picture is needed (e.g., there is no reference picture at, or near, the beginning of the encoded video bit stream). In response, the software creates a reference picture. The software then performs decoding operations, including variable length decoding. The software passes off decoding operations, including created reference picture information comprising coefficient buffers and motion vector buffers, to a hardware accelerated video decoder running on one or more GPUs. The hardware accelerated video decoder performs the remaining decoding operations, including inverse transforms and motion compensation.

In yet another specific implementation, software running on a central processing unit receives an encoded video bit stream. The software running on the CPU performs bit stream parsing and determines that a reference picture is needed (e.g., there is no reference picture at, or near, the beginning of the encoded video bit stream). In response, the software creates a reference picture. The software then performs decoding operations, including variable length decoding and inverse transforms. The software passes off decoding operations, including created reference picture information comprising decoded residual data buffers and motion vector buffers, to a hardware accelerated video decoder running on one or more GPUs. The hardware accelerated video decoder performs the remaining decoding operations, including motion compensation.

Reference pictures can be created in different ways (e.g., depending on the specific situation). For example, a black reference picture can be used to provide a starting point for video decoding. Alternatively, a different color reference picture can be used (e.g., a gray or white reference picture). A reference picture can be created based on a context. For example, if a user is switching video channels and switches to a channel of a particular network, the name or logo of the particular network can be included in the created reference picture. Other information can be included in a created reference picture based on context. For example, if a reference picture is being created as a result of an error condition (e.g., lost signal or lost picture data), the reference picture can be created with the message "an error has occurred." Picture data from other pictures can also be used to create a reference picture (e.g., color data from prior or later pictures in a sequence).

Figure 5:
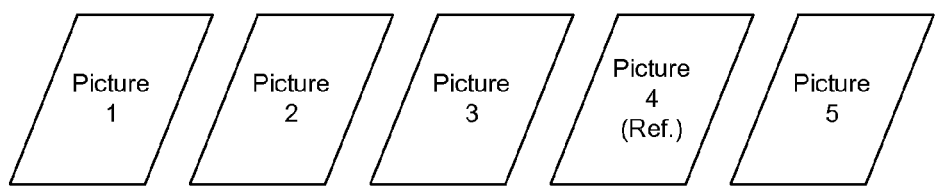
FIG. 5 depicts an example sequence of video pictures that includes a reference picture.

FIG. 5 shows an example sequence of video pictures 500 that includes a reference picture. In the example video sequence 500, pictures 1, 2, 3 and 5 are non-reference pictures, and picture 4 is a reference picture. If this video sequence is received by a video decoder, the video decoder can begin decoding once picture 4 (the reference picture) has been received. A video sequence, such as video sequence 500, can include many more pictures, and include many more reference pictures (e.g., spaced at various intervals in the sequence).

Figure 6:
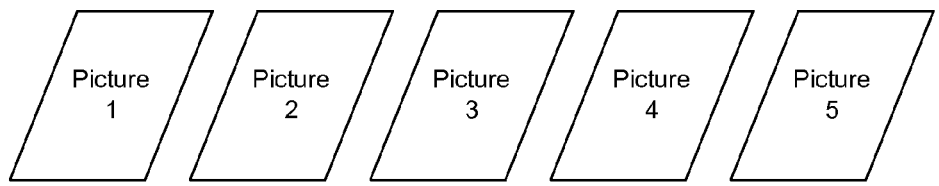
FIG. 6 depicts an example sequence of video pictures without a reference picture.

FIG. 6 shows an example sequence of video pictures 600 that does not include a reference picture. In the example video sequence 600, pictures 1 through 5 are non-reference pictures. Without a reference picture, a video decoder that requires a reference picture in order to begin decoding cannot decode video sequence 600.

Figure 7:
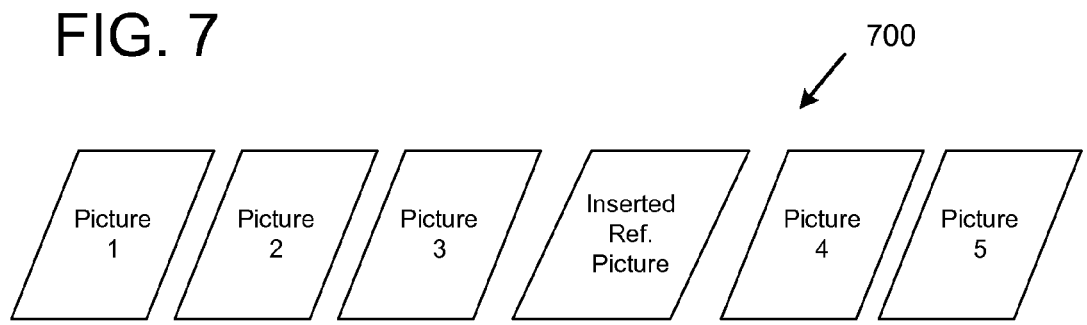
FIG. 7 depicts an example sequence of video pictures with a created reference picture.

FIG. 7 shows an example sequence of video pictures 700 that includes a created reference picture. The sequence of video pictures 700 corresponds to the sequence 600. For example, using the techniques and solutions described herein, video sequence 600 can be received. Upon determining that the sequence 600 does not include a real reference picture, a reference picture can be created and inserted into the video sequence 700. Video sequence 700 illustrates that a created reference picture has been inserted between pictures 3 and 4. Creating and inserting a reference picture can allow a video decoder that would be unable to decode the video sequence 600 to decode the video sequence 700 with the inserted created reference picture.

Figure 8:
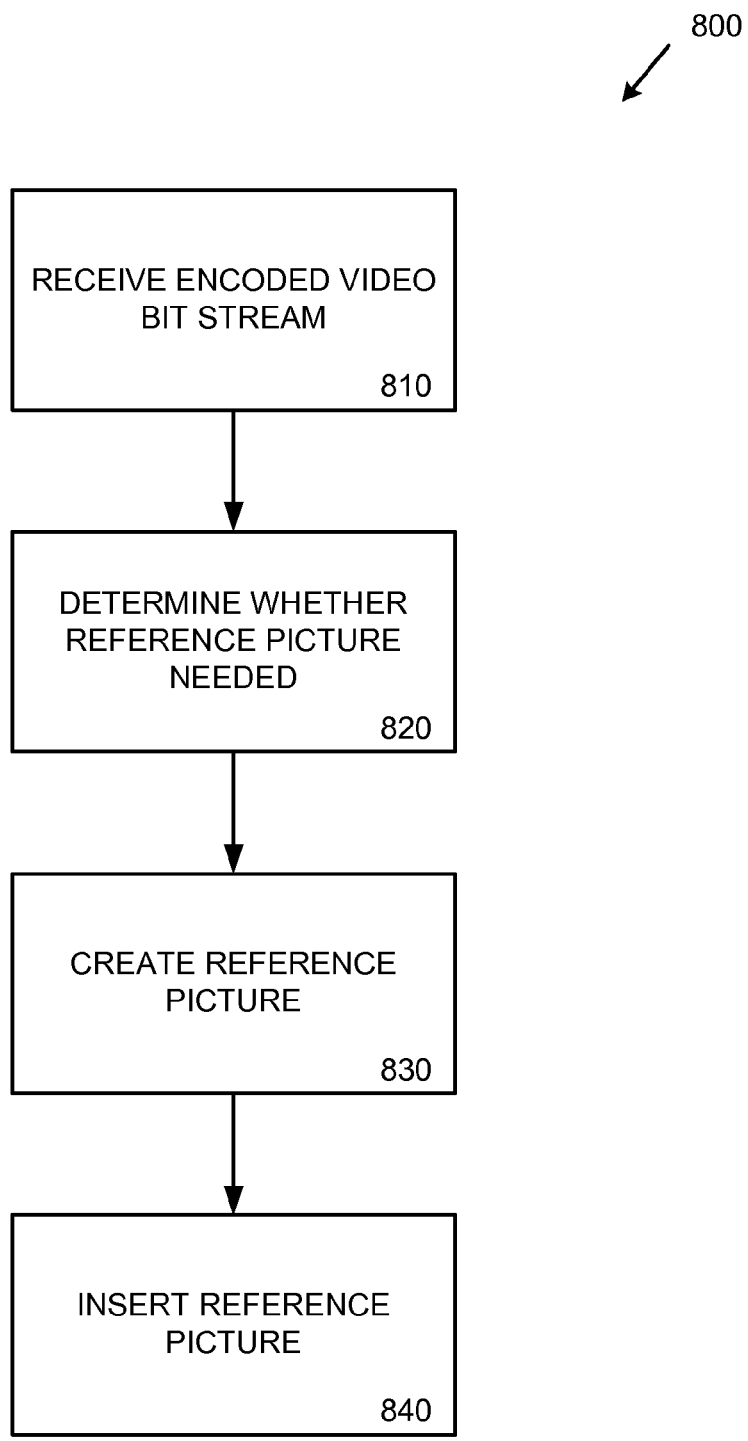
FIG. 8 depicts an example method for decoding video using a created reference picture.

FIG. 8 depicts an example method 800 of for decoding video using a created reference picture. At 810, an encoded video bit stream is received.

At 820, a determination is made whether a reference picture is needed in order to decode the encoded video bit stream. The determination can be made based upon analysis of the encoded video bit stream. For example, a determination can be made that the encoded video bit stream does not begin with a real reference picture and thus a reference picture needs to be created. Furthermore, a determination can be made that a video decoder (e.g., a video decoder running on a CPU or a hardware accelerated video decoder running on a GPU) would be able to decode the encoded video bit stream but for the lack of a reference picture (e.g., a reference picture at the beginning, or near the beginning, of the encoded video bit stream). A determination can also be made that a video decoder expects a reference picture at the beginning of the encoded video bit stream, and while the decoder could begin decoding without a reference picture at the beginning, decoding would likely benefit (e.g., improved picture quality) by a created reference picture.

At 830, in the case that the reference picture is needed, a reference picture is created. For example, a created reference picture can be a black reference picture, or a reference picture comprising different content (e.g., a different color, a message, etc.).

At 840, the created reference picture is inserted into the encoded video bit stream. For example, the created reference picture can be inserted at the beginning of the encoded video bit stream (e.g., so a video decoder can decode the encoded video bit stream from the beginning of the encoded video bit stream using the inserted created reference picture). Inserting the created reference picture can comprise various video encoding operations (e.g., various encoding operations may be required in order to insert the created reference picture into the encoded video bit stream). For example, a reference picture can be created on-the-fly or pre-created and stored ahead of time.

Decoding the encoded video bit stream can be performed by a video decoder (e.g., implemented in hardware, software, firmware, or a combination) running on CPUs, GPUs, or by dividing decoding operations across CPUs and GPUs. For example, a determination can be made regarding whether a hardware accelerated graphics processing unit (e.g., one or more GPUs capable of performing various video decoding operations) is available (e.g., whether a video processing device has a GPU installed). If a hardware accelerated graphics processing unit is available, the encoded video bit stream can be sent to the hardware accelerated graphics processing unit. If a hardware accelerated graphics processing unit is not available, the encoded video bit stream can be decoded by a video decoder running on one or more CPUs.

In a specific implementation, video decoding can begin using a created reference picture while suspending display of the decoded video for a period of time (e.g., for one-half second). In the specific implementation, an encoded video bit stream is received and a determination is made that a reference picture is not present at the beginning of the bit stream. In response, a reference picture is created and inserted at the beginning of the bit stream. Decoding then commences from the beginning of the bit stream using the created reference picture. Because the decoded video is likely not very accurate (i.e., it likely does not match decoded video if a real reference picture were available), display of the decoded video is suspended for the period of time. If, during the period of time (e.g., one-half second), a real reference picture is encountered in the video bit stream, decoding and display can commence from the location of the real reference picture. If, however, a real reference picture is not encountered in the video bit stream during the period of time, display of the decoded video begins from the end of the period of time. Delaying display for a period of time, such as one-half second, allows time for the decoding process, using the created reference picture, to produce more accurately decoded video. For example, experimental results show that, with certain test video sequences, beginning decoding using a created black reference picture for one-half second results in decoded video that is approximately 90% accurate at the end of the one-half second period.

Figure 9:
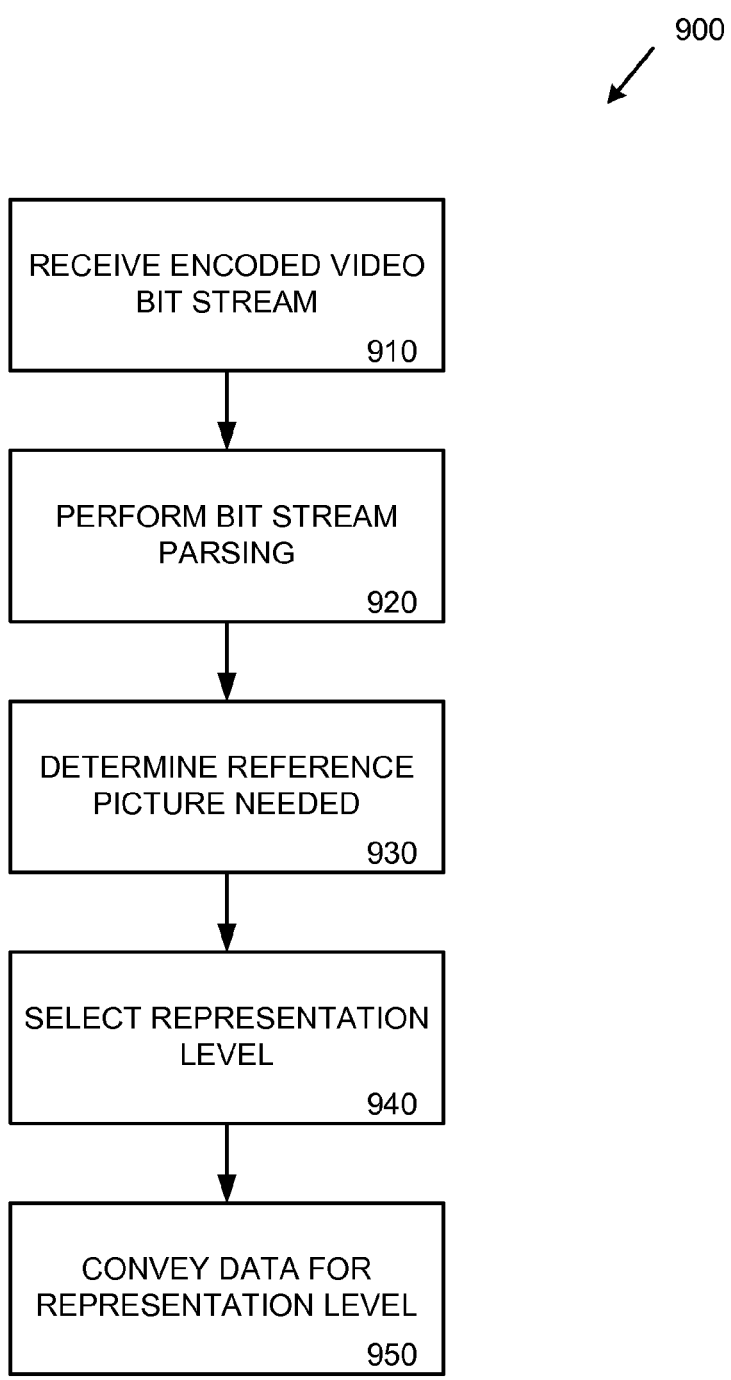
FIG. 9 depicts an example method for decoding video using a created reference picture at a selected representation level.

FIG. 9 depicts an example method 900 of for decoding video using a created reference picture at a selected representation level. At 910, an encoded video bit stream is received, and at 920 bit stream parsing is performed.

At 930, a determination is made that a reference picture is needed in order to decode the encoded video bit stream. The determination can be made based upon the bit stream parsing 920. For example, a determination can be made that the encoded video bit stream does not begin with a real reference picture. Furthermore, a determination can be made that a video decoder (e.g., a video decoder running on a CPU or a hardware accelerated video decoder running on a GPU) would be able to decode the encoded video bit stream but for the lack of a reference picture (e.g., a reference picture at the beginning, or near the beginning, of the encoded video bit stream).

At 940, a representation level is selected for a created reference picture. The representation level can be selected based on the capabilities of a hardware accelerated graphics processing unit. For example, the representation level can correspond to a hardware accelerated graphics processing unit supporting variable length decoding (e.g., supporting decoding operations beginning with variable length decoding), a hardware accelerated graphics processing unit supporting inverse transform (e.g., supporting decoding operations beginning with inverse transform), or a hardware accelerated graphics processing unit supporting motion compensation (e.g., supporting decoding operations beginning with motion compensation).

At 950, data for the selected representation level for the created reference picture is conveyed to a hardware accelerated graphics processing unit. For example, if the representation level corresponds to variable length decoding, the data can comprise compressed bit stream buffers. If the representation level corresponds to inverse transform, the data can comprise coefficient buffers and motion vector buffers. If the representation level corresponds to motion compensation, the data can comprise decoded residual data buffers and motion vector buffers.

For example, receiving the bit stream 910, performing bit stream parsing 920, determining whether a reference picture is needed 930, selecting a representation level 940, and conveying data for the selected representation level 950 can be performed via software running on one or more CPUs. The encoded video bit stream and the data for the selected representation level for the created reference picture can be conveyed to a hardware accelerated graphics processing device running one or more GPUs.

Figure 10:
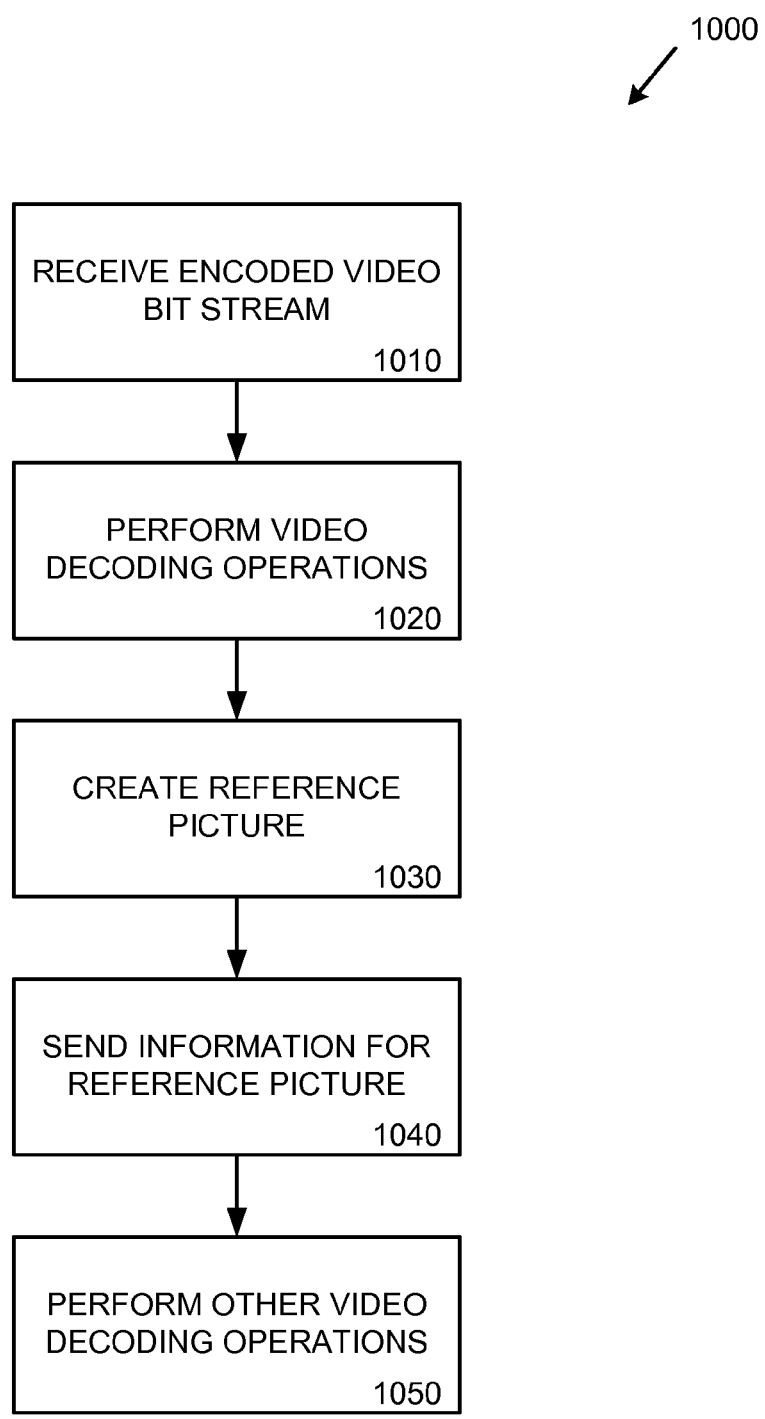
FIG. 10 depicts an example method for decoding video using a created reference picture using CPUs and GPUs.

FIG. 10 depicts an example method 1000 for decoding video with a created reference picture using CPUs and GPUs. In the example method 1000, one or more CPUs run software performing 1010 through 1040. At 1010, an encoded video bit stream is received. At 1020, one or more video decoding operations are performed, where the one or more video decoding operations include bit stream parsing. At 1030, a reference picture is created. At 1040, information for the created reference picture and the encoded video bit stream is sent to one or more GPUs for further decoding.

At 1050, one or more other video decoding operations are performed by the one or more GPUs using the received information. For example, the one or more other video decoding operations can include variable length decoding, inverse transform, and/or motion compensation.

In a specific implementation, the example method 1000 is performed by a video processing device (e.g., a computing device such as a personal computer). The video processing device includes a CPU for performing general computer processing tasks and a GPU for performing graphics processing tasks. When an encoded video bit stream is received, the CPU parses the bit stream. If the encoded video bit stream lacks a reference picture with which to begin decoding (as determined based on the parsing), the CPU creates a reference picture (e.g., a black reference picture). The CPU then determines whether additional video decoding operations need to be performed. For example, the CPU can determine whether additional video decoding operations need to be performed based on capabilities of the GPU. If the GPU supports receiving video information at the variable length decoding representation level, then the CPU can send appropriate information for the created reference picture and the encoded video bit stream (e.g., compressed bit stream buffers) to the GPU for further decoding (e.g., the GPU can then perform video decoding operations including variable length decoding, inverse transform, and/or motion compensation).

Figure 11:
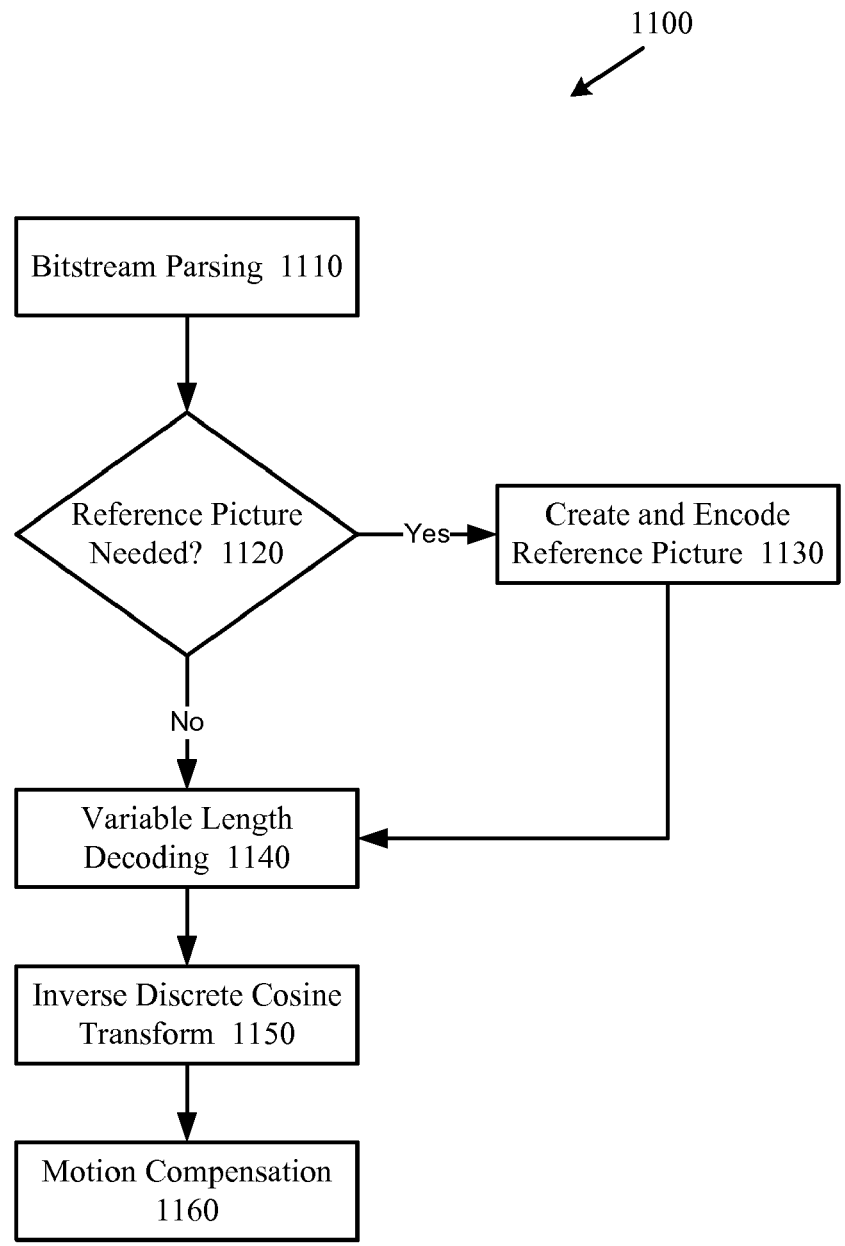
FIG. 11 depicts an example block diagram showing decoding operations performed by a CPU using a created reference picture.

FIG. 11 depicts an example block diagram 1100 showing decoding operations performed by software running on one or more CPUs using a created reference picture. For example, the example block diagram 1100 can be implemented by a video processing device comprising one or more CPUs (e.g., a personal computer).

At 1110, bit stream parsing is performed on an encoded video bit stream. At 1120, a determination is made regarding whether a reference picture is needed. For example, the determination can be made based on capabilities of a software decoder module (e.g., an MPEG2 software decoding module that cannot begin decoding without a reference picture). If a reference picture is needed, it is created and encoded 1130, and used for subsequent video decoding operations, such as variable length decoding 1140. Regardless of whether created reference picture is created or a real reference picture is present, decoding operations continue, including variable length decoding 1140, inverse discrete cosine transform 1150, and motion compensation 1160.

Figure 12:
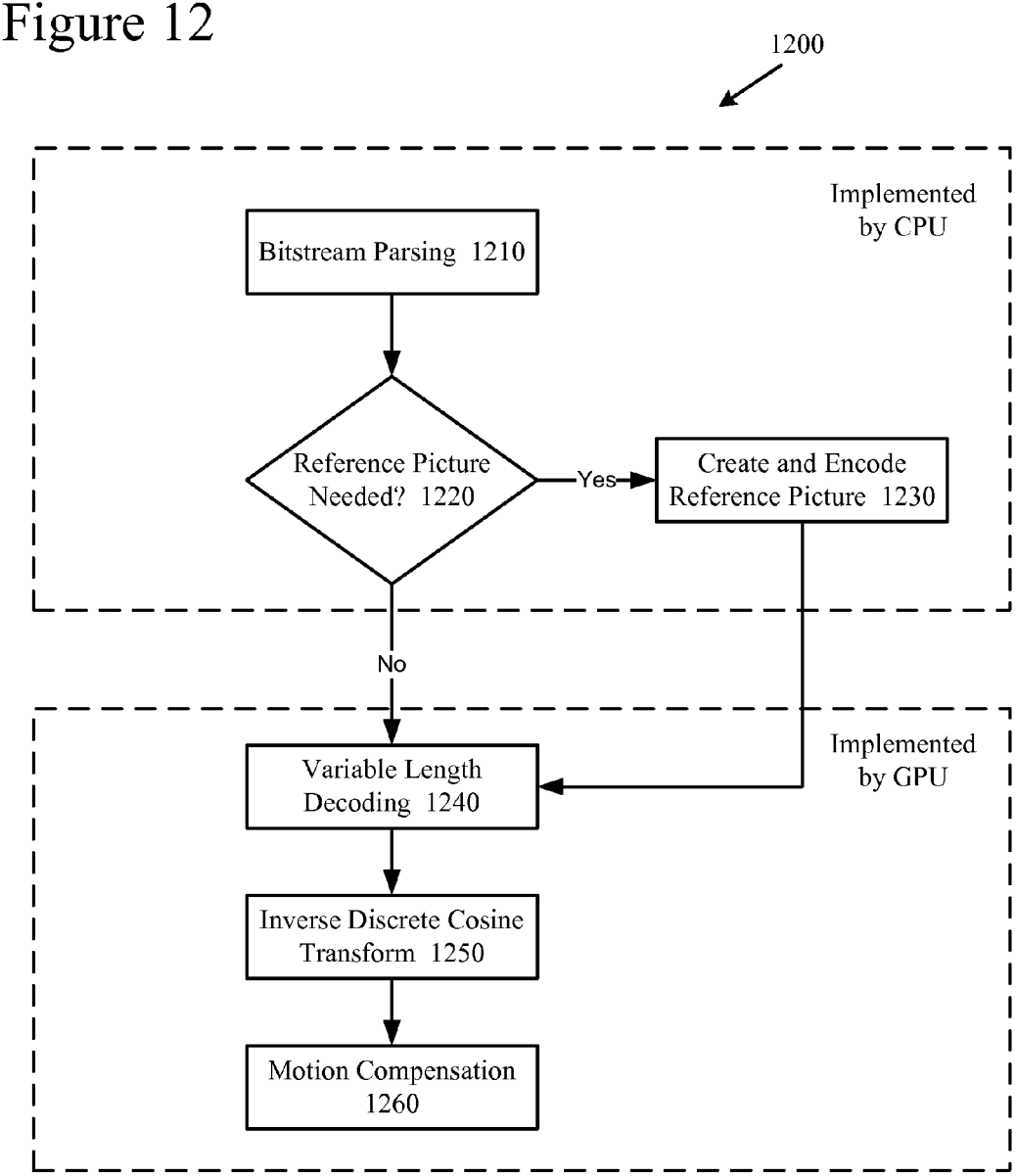
FIG. 12 depicts an example block diagram showing a variable length decoding hardware accelerated GPU implementation.

FIG. 12 depicts an example block diagram 1200 showing a variable length decoding hardware accelerated GPU implementation. In the example block diagram 1200, a CPU (or multiple CPUs) performs initial video decoding operations while a GPU (or multiple GPUs) performs other video decoding operations. For example, the example block diagram 1200 can be implemented by a video processing device comprising one or more CPUs and one or more GPUs (e.g., a personal computer with a built-in or add-on graphics accelerator).

At 1210, bit stream parsing is performed on an encoded video bit stream. At 1220, a determination is made regarding whether a reference picture is needed. For example, the determination can be made based on capabilities of the hardware accelerated graphics processing (e.g., that the hardware accelerated GPU cannot begin decoding without a reference picture). If a reference picture is needed, it is created and encoded 1230, and used for subsequent video decoding operations performed by the GPU, such as variable length decoding 1240. Regardless of whether a reference picture is created or a real reference picture is present, decoding operations continue, including variable length decoding 1240, inverse discrete cosine transform 1250, and motion compensation 1260. In the example block diagram 1200, video decoding operations 1240-1260 are performed by the GPU using information received from the CPU.

Figure 13:
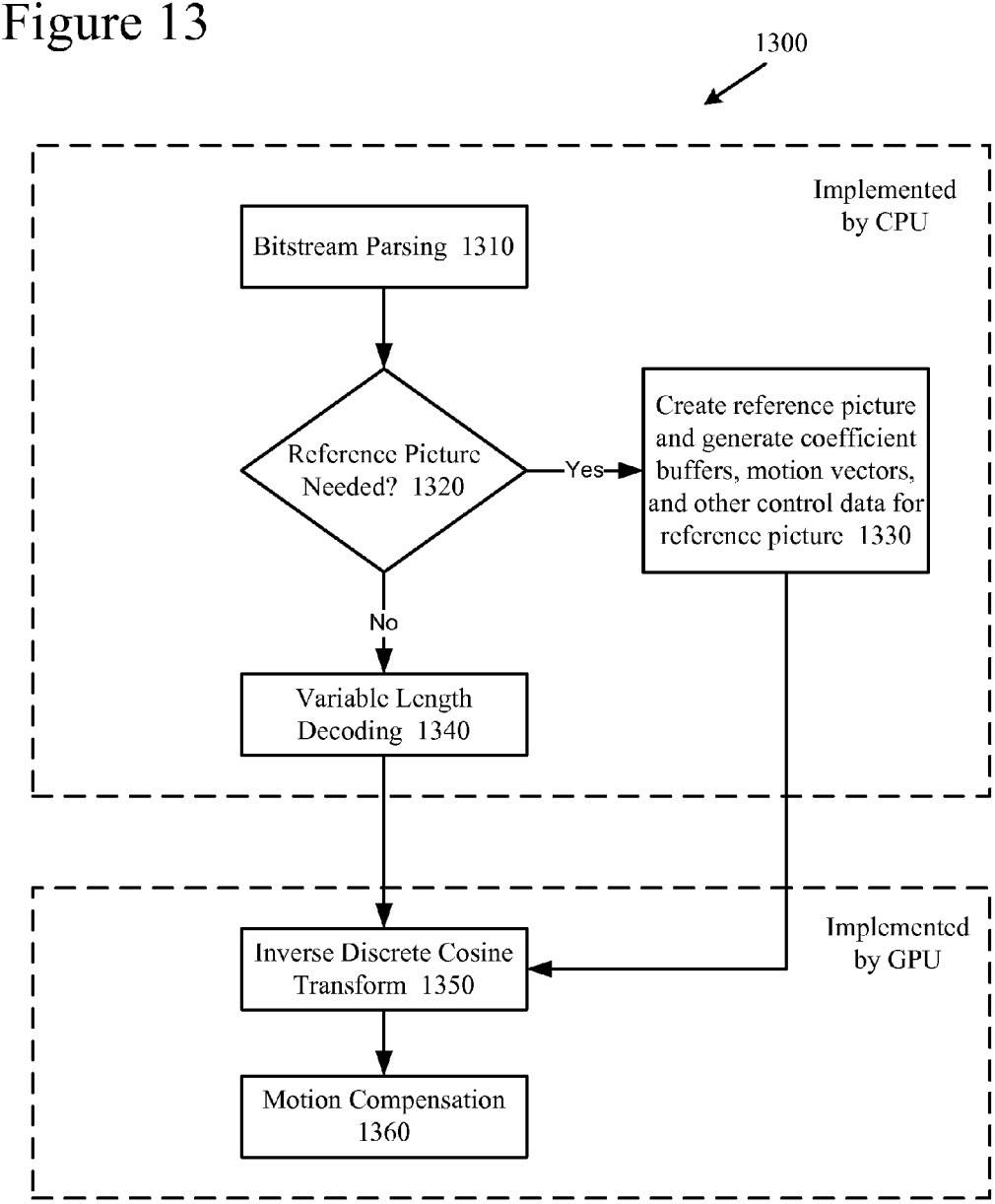
FIG. 13 depicts an example block diagram showing an inverse transform hardware accelerated GPU implementation.

FIG. 13 depicts an example block diagram 1300 showing an inverse transform hardware accelerated GPU implementation. In the example block diagram 1300, a CPU (or multiple CPUs) performs initial video decoding operations while a GPU (or multiple GPUs) performs other video decoding operations. For example, the example block diagram 1300 can be implemented by a video processing device comprising one or more CPUs and one or more GPUs (e.g., a personal computer with a built-in or add-on graphics accelerator).

At 1310, bit stream parsing is performed on an encoded video bit stream. At 1320, a determination is made regarding whether a reference picture is needed. For example, the determination can be made based on capabilities of the hardware accelerated graphics processing (e.g., that the hardware accelerated GPU cannot begin decoding without a reference picture). If a reference picture is needed, it is created 1330 (e.g., along with coefficient buffers, motion vectors and/or other control data for the created reference picture), and used for subsequent video decoding operations. Regardless of whether a reference picture is created or a real reference picture is present, decoding operations continue, including variable length decoding 1340, inverse transform 1350, and motion compensation 1360. If a reference picture was created, reference picture information is sent to the GPU for use with inverse transform 1350, and possibly other video decoding operations. In the example block diagram 1300, video decoding operations 1350 and 1360 are performed by the GPU using information received from the CPU.

Figure 14:
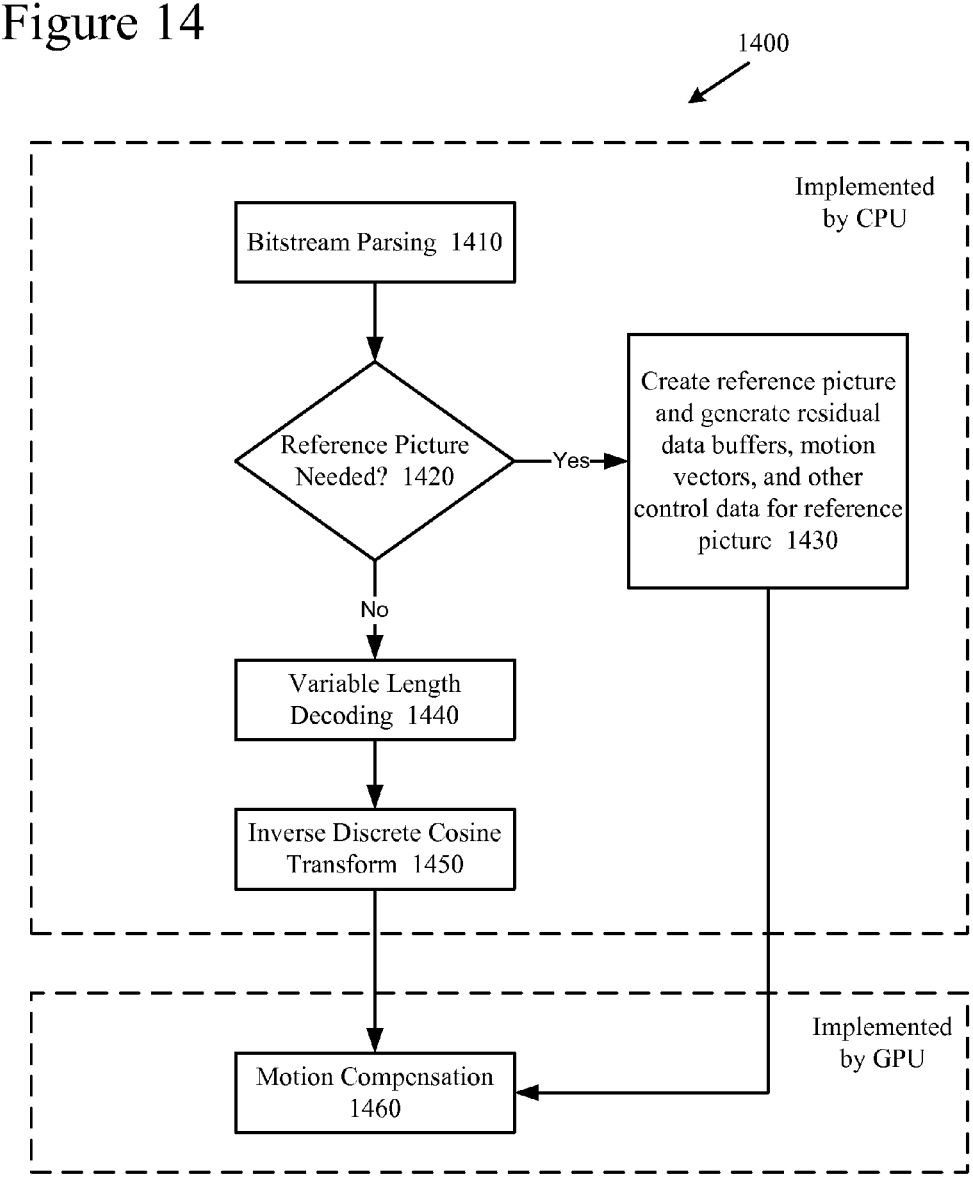
FIG. 14 depicts an example block diagram showing a motion compensation hardware accelerated GPU implementation.

FIG. 14 depicts an example block diagram 1400 showing a motion compensation hardware accelerated GPU implementation. In the example block diagram 1400, a CPU (or multiple CPUs) performs initial video decoding operations while a GPU (or multiple GPUs) performs other video decoding operations. For example, the example block diagram 1400 can be implemented by a video processing device comprising one or more CPUs and one or more GPUs (e.g., a personal computer with a built-in or add-on graphics accelerator).

At 1410, bit stream parsing is performed on an encoded video bit stream. At 1420, a determination is made regarding whether a reference picture is needed. For example, the determination can be made based on capabilities of the hardware accelerated graphics processing (e.g., that the hardware accelerated GPU cannot begin decoding without a reference picture). If a reference picture is needed, it is created 1430 (e.g., along with residual data buffers, motion vectors, and/or other control data for the created reference picture), and used for subsequent video decoding operations. Regardless of whether a reference picture is created or a real reference picture is present, decoding operations continue, including variable length decoding 1440, inverse transform 1450, and motion compensation 1460. If a reference picture was created, reference picture information is sent to the GPU for use with motion compensation 1460, and possibly other video decoding operations. In the example block diagram 1400, motion compensation 1460 performed by the GPU using information received from the CPU.

Any of the methods described herein can be performed via one or more computer-readable media (e.g., storage or other tangible media) having computer-executable instructions for performing (e.g., causing a device, such as a video processing device, to perform) such methods. Operation can be fully automatic, semi-automatic, or involve manual intervention.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method, implemented at least in part by a video processing device, for decoding video, the method comprising:
    receiving an encoded video bit stream;
    determining whether a reference picture is needed in order to decode the encoded video bit stream;
    in the case that the reference picture is needed, creating the reference picture;
    inserting the created reference picture into the encoded video bit stream, wherein the encoded video bit stream is decoded using, at least in part, the inserted created reference picture;
    beginning decoding the encoded video bit stream using the inserted created reference picture for a pre-defined length of time, wherein the beginning decoding is performed without initiating display of the decoded video;
    if a real reference picture is encountered in the encoded video bit stream during the pre-defined length of time, continuing decoding the encoded video bit stream using the real reference picture and initiating display of the decoded video; and
    if a real reference picture is not encountered in the encoded video bit stream during the pre-defined length of time, continuing decoding the encoded video bit stream using the inserted created reference picture and, at the end of the pre-defined length of time, initiating display of the decoded video.

2. The method of claim 1 wherein the encoded video bit stream with the inserted created reference picture is sent to a video decoder, wherein the video decoder is incapable of starting decoding without a reference picture, and wherein the video decoder uses the inserted created reference picture to start decoding.

3. The method of claim 1 further comprising:
    determining whether a hardware accelerated graphics processing unit is available for decoding the encoded video bit stream; and
    responsive to determining that the hardware accelerated graphics processing unit is available, sending the encoded video bit stream with the inserted created reference picture to the hardware accelerated graphics processing unit.

4. The method of claim 1 further comprising:
    determining whether a hardware accelerated graphics processing unit is available for decoding the encoded video bit stream; and
    responsive to determining that the hardware accelerated graphics processing unit is unavailable, sending the encoded video bit stream with the inserted created reference picture to a software video decoder running on one or more central processing units.

5. The method of claim 1 wherein the pre-defined length of time is one-half second.

6. A method, implemented at least in part by a video processing device, for decoding video, the method comprising, with software running on one or more central processing units:
    receiving an encoded video bit stream;
    performing bit stream parsing on the received encoded video bit stream;
    based on the parsing, determining that a created reference picture is needed in order to decode the encoded video bit stream;
    selecting a representation level for the created reference picture, wherein the representation level is selected based on capabilities of a hardware accelerated graphics processing unit;
    sending data at the selected representation level for the created reference picture to the hardware accelerated graphics processing unit, wherein the hardware accelerated graphics processing unit performs one or more video decoding operations to decode the encoded video bit stream using, at least in part, the data at the selected representation level for the created reference picture;
    beginning decoding the encoded video bit stream using the created reference picture, wherein the beginning decoding is performed without initiating display of the decoded video;
    if a real reference picture is encountered in the encoded video bit stream, continuing decoding the encoded video bit stream using the real reference picture and initiating display of the decoded video; and
    otherwise, continuing decoding the encoded video bit stream and, at the end of a pre-defined length of time, initiating display of the decoded video.

7. The method of claim 6 wherein the hardware accelerated graphics processing unit is unable to begin decoding the encoded video bit stream without receiving the data for the selected representation level for the created reference picture.

8. The method of claim 6 wherein the representation level is a variable length decoding level, and wherein the data at the selected representation level for the created reference picture comprises compressed bit stream buffers.

9. The method of claim 6 wherein the representation level is an inverse transform level, and wherein the data at the selected representation level for the created reference picture comprises coefficient buffers and motion vector buffers.

10. The method of claim 6 wherein the representation level is a motion compensation level, and wherein the data at the selected representation level for the created reference picture comprises decoded residual data buffers and motion vector buffers.

11. The method of claim 6 wherein the determining that a created reference picture is needed in order to decode the encoded video bit stream comprises:
 based on the parsing, determining that the encoded video bit stream does not start with a real reference picture; and
 determining that the hardware accelerated graphics processing unit otherwise capable of decoding the encoded video bit stream cannot decode the encoded video bit stream due to the lack of a real reference picture at the beginning of the encoded video bit stream.

12. The method of claim 6 wherein the pre-defined length of time is one-half second.

13. A method comprising:
 using one or more CPUs:
  receiving an encoded video bit stream, wherein the encoded video bit stream lacks a reference picture with which to begin decoding;
  performing one or more video decoding operations, the one or more video decoding operations comprising bit stream parsing;
  based on the parsing, creating a reference picture; and
  sending information for the created reference picture and the encoded video bit stream to one or more GPUs; and
 using the one or more GPUs:
  performing one or more other video decoding operations using the information for the created reference picture and the encoded video bit stream received from the one or more CPUs, wherein the one or more other video decoding operations are different operations from the one or more video decoding operations performed using the one or more CPUs; and
 wherein the one or more GPUs begin decoding the encoded video bit stream using the created reference picture without initiating display of the decoded video;
 wherein, if a real reference picture is encountered in the encoded video bit stream, the one or more GPUs continue decoding the encoded video bit stream using the real reference picture and display of the decoded video is initiated; and
 otherwise, the one or more GPUs continue decoding the encoded video bit stream and, at the end of a pre-defined length of time, display of the decoded video is initiated.

14. The method of claim 13 wherein the information for the created reference picture comprises compressed bit stream buffers, and wherein the one or more other video decoding operations performed using the one or more GPUs comprise variable length decoding, inverse transform, and motion compensation.

15. The method of claim 13 wherein the information for the created reference picture comprises coefficient buffers and motion vector buffers, wherein the one or more other video decoding operations performed using the one or more GPUs comprise inverse transform and motion compensation, and wherein the one or more video decoding operations performed using the one or more CPUs further comprises variable length decoding.

16. The method of claim 13 wherein the information for the created reference picture comprises decoded residual data buffers and motion vector buffers, wherein the one or more other video decoding operations performed using the one or more GPUs comprises motion compensation, and wherein the one or more video decoding operations performed using the one or more CPUs further comprises variable length decoding and inverse transform.

17. The method of claim 13 wherein the pre-defined length of time is one-half second.

* * * * *